Oct. 4, 1932.  C. M. BOSWORTH  1,880,742
CUTTING TOOL HEAD
Filed Jan. 25, 1929   5 Sheets-Sheet 4

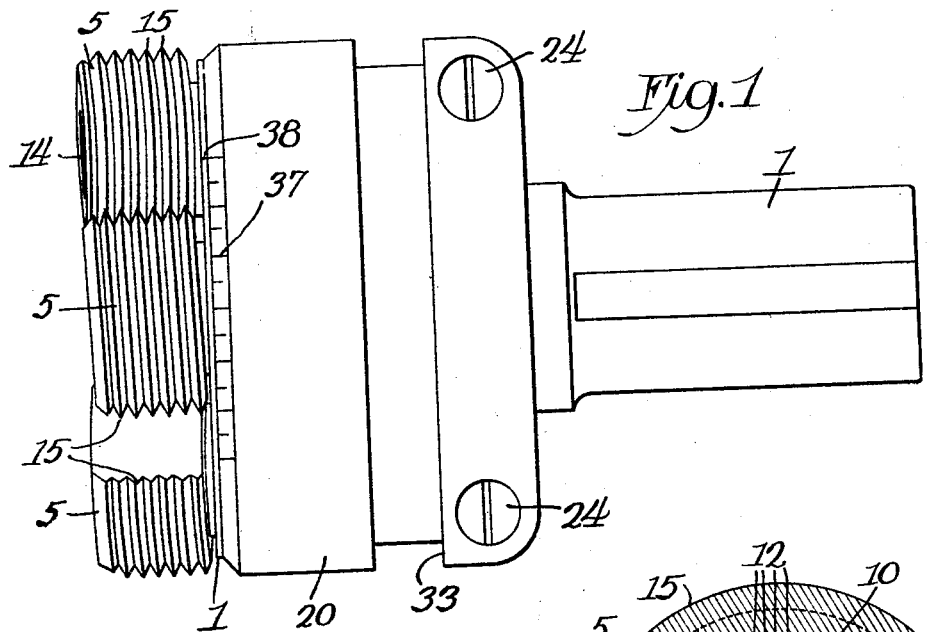
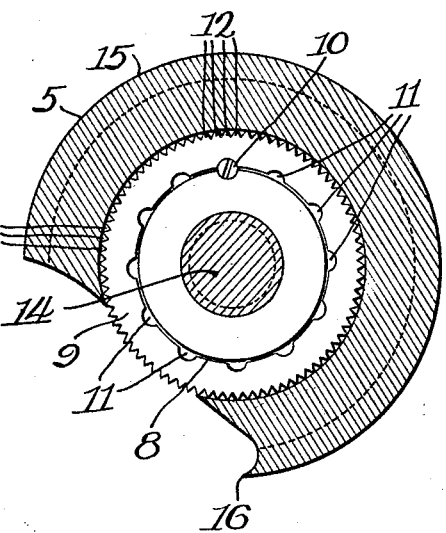
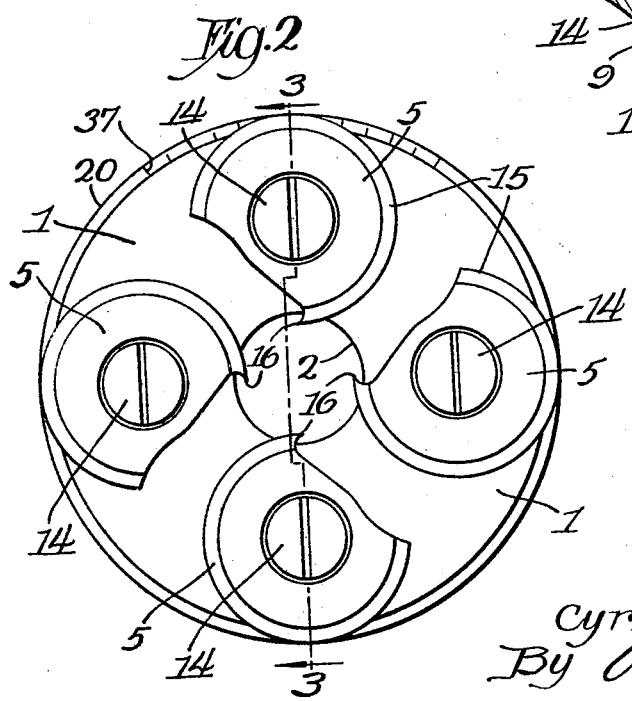

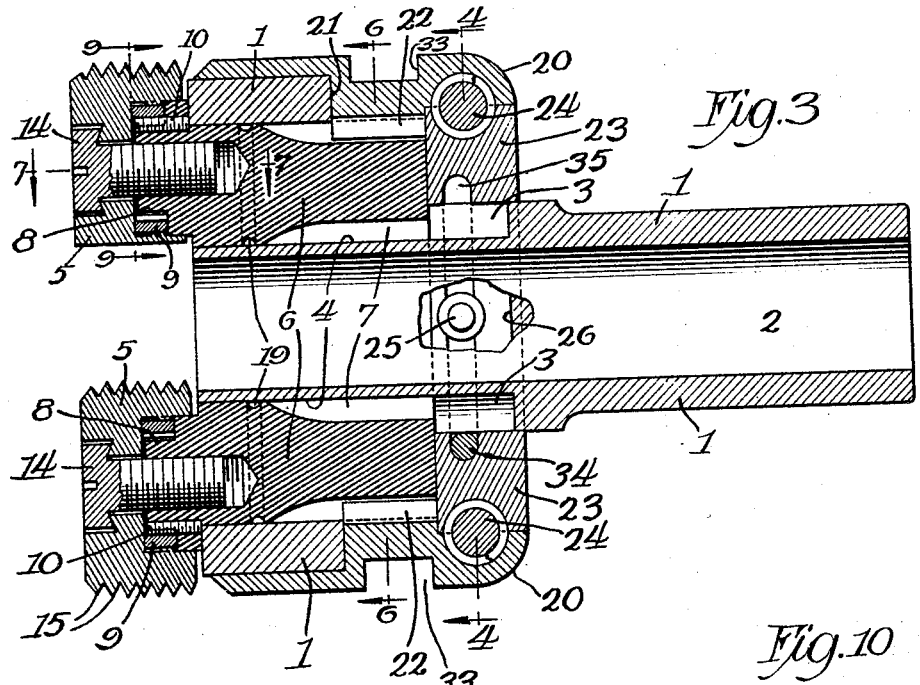
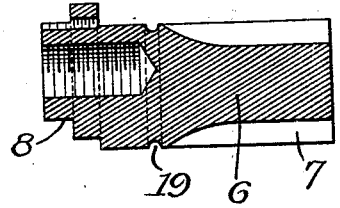
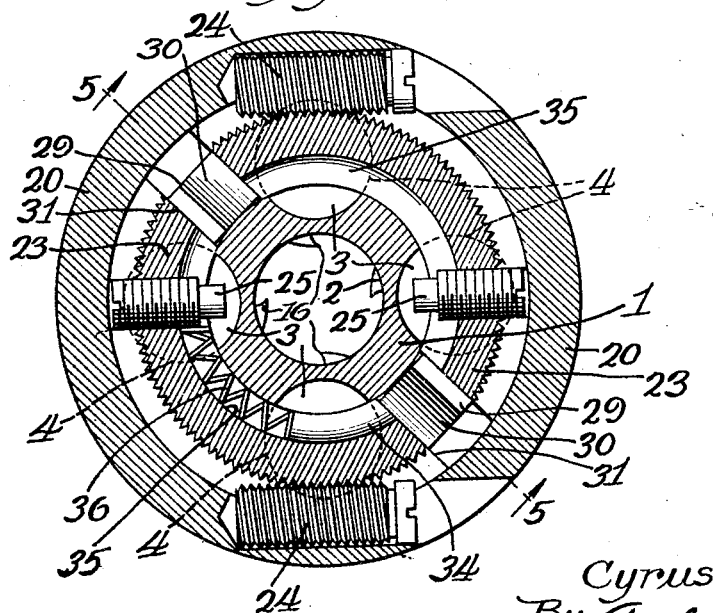
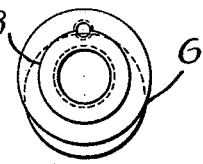

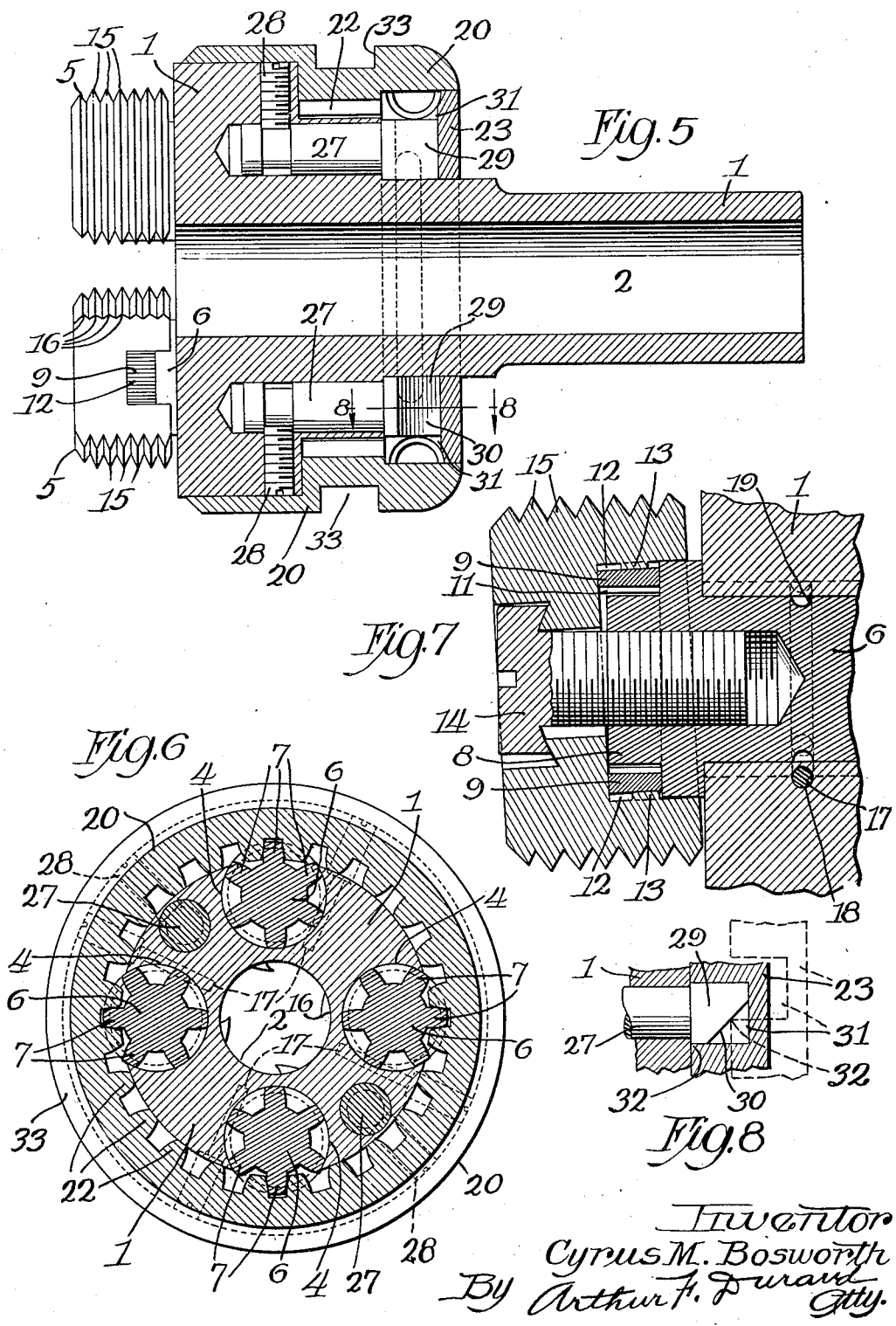

Inventor:
Cyrus M. Bosworth
By Arthur F. Durand
Atty.

Oct. 4, 1932.  C. M. BOSWORTH  1,880,742
CUTTING TOOL HEAD
Filed Jan. 25, 1929  5 Sheets-Sheet 5

Inventor
Cyrus M. Bosworth
By Arthur F. Durand Atty.

Patented Oct. 4, 1932

1,880,742

UNITED STATES PATENT OFFICE

CYRUS M. BOSWORTH, OF RIVERSIDE, ILLINOIS

CUTTING TOOL HEAD

Application filed January 25, 1929. Serial No. 334,911.

This invention relates to tool heads or cutter heads, for cutting down suitable metal stock, such as rods or tubes, for various purposes, such as cutting threads on the rod or pipe, or for otherwise reducing the stock to the desired form.

Generally stated, the object of the invention is to provide a cutter head having chasers for cutting the stock and reducing it to the desired form, and in which said chasers are provided with eccentric mountings, whereby rotation of said mountings, either in adjusting the chasers for accurate work, or in causing the chasers to either grip or release the stock, will cause movement of the chasers toward or away from the axis of the cutter head, thereby to insure the desired set adjustment, or to cause the chasers to grip or release the stock.

It is also an object to provide certain details and features of construction and combinations tending to increase the general efficiency and the desirability of a rotary cutter head provided with revolving chasers and having chaser mountings of this particular character.

To the foregoing and other useful ends, the invention consists in the matters hereinafter set forth and claimed, and shown in the accompanying drawings, in which,—

Fig. 1 is a side elevation of a revolving chaser cutter head embodying the principles of the invention.

Fig. 2 is an end elevation of said cutter head.

Fig. 3 is a vertical longitudinal section on line 3—3 in Fig. 2.

Fig. 4 is a transverse vertical section on line 4—4 in Fig. 3.

Fig. 5 is a longitudinal section on line 5—5 in Fig. 4.

Fig. 6 is a transverse section on line 6—6 in Fig. 3.

Fig. 7 is a longitudinal axial section of one of the chasers and its mounting, on a larger scale, on line 7—7 in Fig. 3.

Fig. 8 is a detail section on line 8—8 in Fig. 5.

Fig. 9 is a transverse cross section of one of the chasers, on line 9—9 in Fig. 3, on a larger scale.

Fig. 10 is a detail longitudinal section of one of the eccentric trunnion mountings for the chasers.

Fig. 11 is an end elevation of the mounting shown in Fig. 10.

Figure 12:
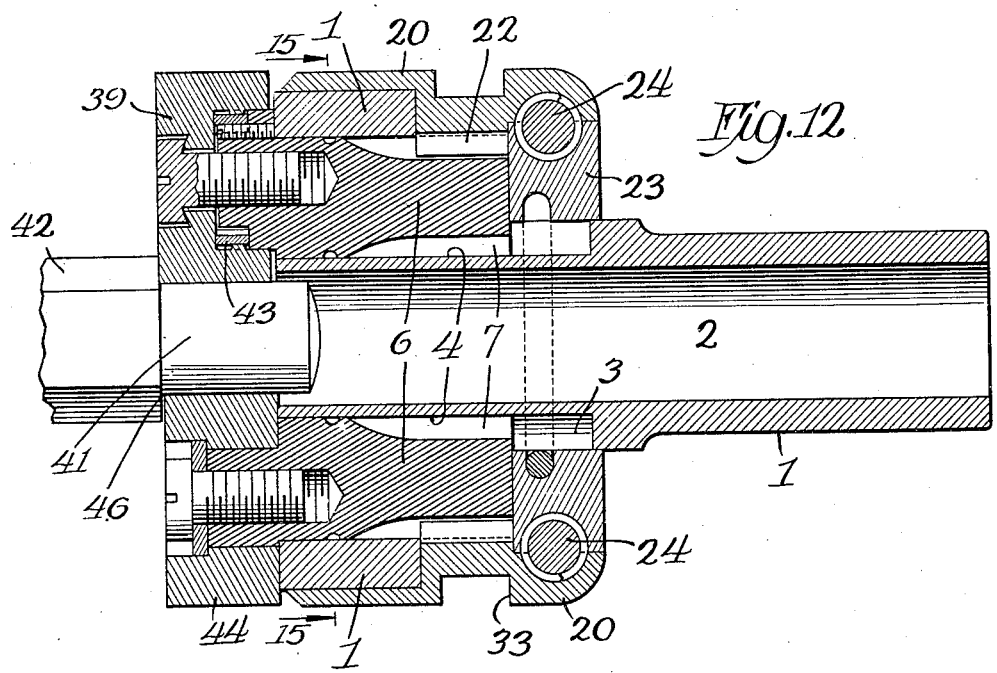
Fig. 12 is a view similar to Fig. 3, showing a different form of the invention, for a somewhat different purpose or use, being a longitudinal section on line 12—12 in Fig. 13.

Referring to Figs 1 to 11, inclusive, the invention comprises a body member 1 having a longitudinal bore 2, peripheral notches 3, and other peripheral and semicylindrical notches 4, as shown. Each chaser 5 is of any suitable or desired form, as for cutting screw threads, as shown, and is mounted on an eccentric trunnion mounting 6 held in the notches 4 previously mentioned. Each trunnion mounting is formed with gear teeth 7 on its inner portion, and has an eccentric end portion 8 upon which the washer or ring 9 is mounted and keyed in place by a screw 10, as shown. The ring 9, for this particular purpose, is preferably thicker at one side of its diameter than the other, and has its inner periphery provided with notches 11, as shown, while the outer periphery of this ring is provided with teeth 12 which engage similar teeth 13 formed on the inner periphery of the chaser. Each chaser has a retaining screw 14 inserted through its center and into the trunnion mounting, as shown more clearly in Fig. 7 of the drawings, thereby holding the chaser against displacement. For the purpose of cutting threads on a pipe or rod, each chaser is provided with semi-annular or semicircumferential teeth or ribs 15, and each chaser is mutilated on one side, or partially cut away, thereby forming the cutting edges 16 at one side of the gap thus formed in each chaser.

Each trunnion mounting 6 is held against axial displacement by a pin 17 inserted in a groove 18 in the member 1, and in a groove 19 formed in the mounting, whereby the latter is free to turn in the body 1, but is held against endwise displacement. A sleeve 20 is formed to shoulder against the shoulder 21 on the body member 1, as shown, and is provided with gear teeth 22 for engagement with the gear teeth 7 of the trunnion mountings. A ring member 23 is keyed to the member by the screws 24, and by rotating these screws, it will be seen, relative rotary adjustment can be obtained as between the member 20 and the member 23, in a manner that will be readily understood. The member 23 is provided with stop screws 25 that engage in the notches 3 previously mentioned, each notch providing a shoulder 26 for engagement with the inner end of such screw, when the sleeve member 20 is caused to have axial movement or displacement away from the chasers.

The body member 1 is keyed to the ring 23 by the longitudinally extending key pins 27, as shown in Fig. 5 of the drawings. These key pins are held in the body member 1 by the set screws 28, and the end portion of each key pin is provided with a head 29 having a bevel 30, as shown in Fig. 8 of the drawings. The ring member 23 is provided with cavities 31 for said heads 29, and each cavity has a working corner 32 for engagement with the bevel 30, when the sleeve 20 and the ring 23 are axially displaced away from the chasers.

For the axial displacement of the sleeve 20 and ring member 23, for the purpose of releasing the chasers from the rod or pipe, any suitable means can be employed, such as a fork (not shown) for engaging the groove 33 of the sleeve 20 and for thus shifting this sleeve axially. A curved pin 34 is mounted in a groove 35 formed in the inner periphery of the ring member 23, and in this groove there is a spring 36 interposed between one end of said pin and one of the stop screws 25 previously mentioned. After the stock has been cut in the desired manner, the sleeve member 20 and the ring member 23 are shifted axially, away from the chasers 5, and this brings the working corner 32 of the ring member 23 into engagement with the bevel 30, and the spring 36 and the action of the cutters or chasers against the stock cause the shoulder 32 to ride up the bevel 30, on each pin 27, thus causing relative rotation between the member 20 and the body member 1, sufficient to cause the gear teeth 22 to slightly rotate the trunnion mountings 6, whereby the chasers are rotated slightly, and eccentrically, causing the chasers to move away from the stock and to disengage the latter when the cutting operation is finished. When the sleeve member 20 is then moved back into operative position, as shown in the drawings, the cutters or chasers regain their operative cutting positions, in readiness to cut another piece of metal stock.

The chasers may be sharpened from time to time, by grinding their cutting edges 16 back a distance. This, of course, will necessitate readjustment of the cutters or chasers on their eccentric trunnion mountings. Such readjustment is done by re-engaging the teeth 13 with different teeth 12, so that each chaser will have a slightly rotatively different position when sharpened and returned to the cutting head. It will also be seen that the lopsided or unsymmetrical ring or washer 9 causes each chaser or cutter to have a skewed or angular position, so that its axis is at an angle to the axis of the trunnion mounting, and at an angle to the central axis of the body member 1, to which latter the power can be applied to turn the cutter head. This skewed or angular adjustment of the cutters or chasers can be changed by withdrawing the key pins 10 and inserting them in different notches 11. Thus each trunnion mounting can be rotated slightly, by the screws 24, to adjust the chasers or cutters toward or away from the metal stock to be cut, and, in addition, each chaser or cutter is rotatably adjustable on its allotted trunnion mounting, and is also angularly adjustable on its trunnion mounting. When these adjustments are properly obtained, the sleeve member 20 and the ring member 23 can be reciprocated back and forth, as described, without disturbing the said accurate adjustment of the chasers relative to the metal stock, whereby the chasers will come back to work each time, after being released from the stock, in exactly the same cutting adjustment.

A scale 37 can be placed on the sleeve member 20, as shown in Fig. 1, and an indicator mark or notch 38 can be placed upon the adjacent portion of the end edge or periphery of the body member 1, as shown in Fig. 1 of the drawings, whereby the relative rotation between the sleeve member 20 and the body member 1, produced by adjustment of the screws 24, necessary to adjust the chasers or cutters for different diameters of stock, can be readily determined.

Figure 13:
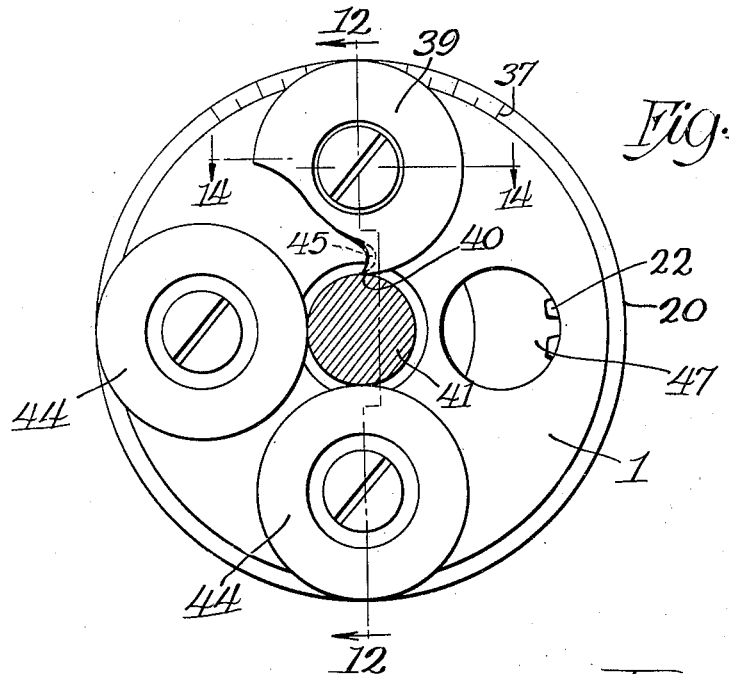
Fig. 13 is an end elevation of the cutter head shown in Fig. 12.
Figure 15:
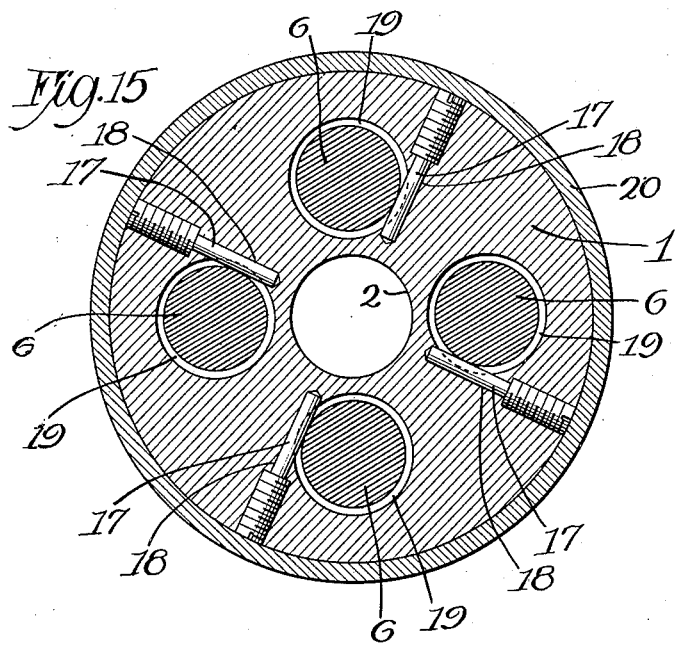
Fig. 15 is a section on line 15—15 in Fig. 12.
Figure 14:
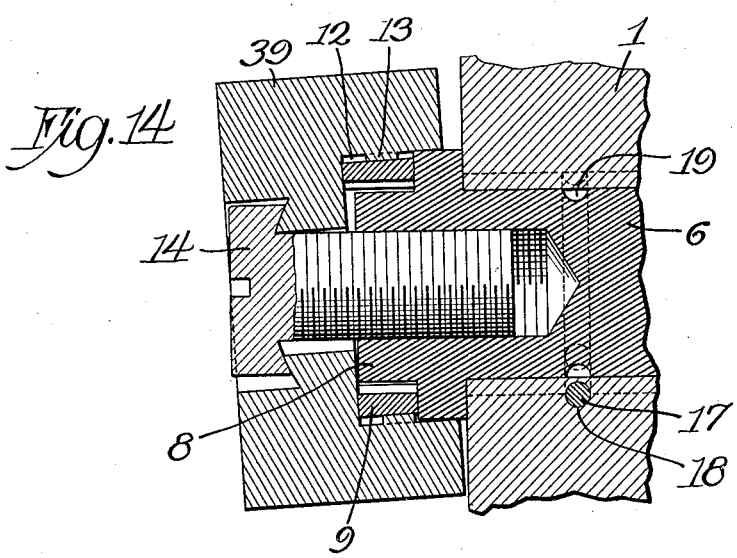
Fig. 14 is an enlarged detail section on line 14—14 in Fig. 13.

In Figs. 12 and 13 the construction is similar to that previously described, so far as the cutter head and the trunnion mountings are concerned, but in this case the chaser or cutter 39 is provided with a straight cutting edge 40 to simply cut a smooth cylindrical surface 41 on the end portion of the metal stock 42, thereby cutting a smooth cylindrical reduced end portion on the end of this stock or rod, which latter may be a polygonal rod, or rod of any shape. One advantage of a tool of this kind, over those heretofore used for this purpose, is that no spiral groove is left on the finished work, as the cutter does not drag over the work when the latter is removed. For this purpose, the chaser 39 has its axis also at an angle to the axis of the trunnion mounting, and to the central axis of the cutter head, because in this case the ring or washer 43 is similar to the ring 9, so that the chaser will have clearance on its flat front face for cutting. Furthermore, for work of this kind, the other chasers 44 do not have to be cutters, but may be merely rollers with their axes parallel with those of the trunnions 6 and body member 1 to engage the work. The chaser 39 may be ground or cut back to the dotted line 45, to give it more hook, if necessary or desirable. This will insure a smooth cylindrical surface 41, clear up to the shoulder 46 of the rod or stock. Obviously, however, the body member 1 may also be bored at 47 to receive a fourth chaser, which fourth chaser may be simply a roller, like the chasers 44, although the device will work for this purpose with either two or three cylindrical rollers. The release of the chaser and rolls from the work, and the adjustment of the chaser on its trunnion mounting, are similar to those previously described, whereby for this particular kind of work, as well as for other kinds of work, it is obvious that the same head and trunnion mountings can be employed, and that only the chasers themselves, as well as perhaps the rings or washers 43, need be different from those previously described in connection with Figs. 1 to 11, inclusive. Therefore, and with the eccentric trunnion mountings shown and described, different kinds of chasers can be used for different kinds of work, depending upon the character of the work. Therefore, one set of chasers can be taken off, and another set can be substituted therefor, for doing different kinds of work. In each case, however, the chasers have eccentric trunnion mountings which can be partially rotated to adjust the cutters or chasers for the particular diameter of stock to be operated upon, and each chaser or cutter can be rotatably adjusted on its allotted trunnion mounting for more accurate adjustment, or for readjustment. Also, in each case, and regardless of the form of the cutters or chasers, and the kind of work to be done, the chasers are caused to grip or release the stock by means of an axially reciprocating member having means for causing sufficient partial rotation or oscillation of the trunnion mountings to cause the chasers to move toward or away from the stock, and to thereby either grip or release the latter, but without disturbing the accurate cutting adjustment of the chasers.

Of course, it will be understood that the stock to be operated upon can be held against rotation, and that the cutter head can be rotated and permitted to have progressive axial movement at the same time, or feeding movement, if desired. On the other hand, the cutter head can be held against rotation and the stock can be rotated, and either the cutter head or the stock can be given axial feeding movement, during the cutting operation, if necessary; it being thus obvious that there are different ways of using the invention and different ways of operating the same; but, in any event, the cutter head and the stock, such as a rod or tube, must have relative rotation.

It will be seen, therefore, that this invention provides for the use of cutters having a longer life than usual, as they can be ground back, from time to time, clear around their peripheries. Also, these cutters or chasers can be produced inexpensively, and at low cost, and the same chasers can be used on any diameter of stock within the range of the cutter head. Moreover, the chasers can be used for both right and left hand threading, simply by adjustment thereof, with no additional parts required, and in this way a smaller number of chasers can be carried in stock. The cutter head will cut more accurately than some devices heretofore employed for this purpose, and will not cut tapering, because of the way in which the chasers are mounted. Again, the cutting life of each chaser for each grinding or re-sharpening operation is longer than usual, because of the manner in which the chasers or cutters are released from the work. The cutting edges of the chasers are protected, in the sense that in releasing the work the chasers are moved away from the chips, instead of being pulled through the chips, and thus the method of removal of the tool from the work helps to prolong the life of the cutting edges of the chasers. Obviously, the device could be used for either external or internal threading of pipes or other hollow objects. For tapping or internally threading a pipe, for example, the chasers are simply adjusted to bring their cutting edges into a position to engage the interior of the pipe or other hollow object.

What I claim as my invention is:

1. A cutter head provided with revolving chasers for cutting cylindrical metal stock in the desired manner, having eccentric trunnion mountings the axes of which are parallel with the axis of relative rotation between the cutter head and the metal stock to be cut, said chasers being carried eccentrically on said mountings, forming rotatively adjustable caps on the outer ends of said mountings, for taking up wear and sharpening of any cutter, and instrumentalities for rotatively moving said trunnion mountings to cause movement of said chasers toward and away from said axis of relative rotation, to open and close the head.

2. A structure as specified in claim 1, said instrumentalities comprising an axially movable sleeve member on said head, and devices co-operating with said sleeve member to cause the axial movement thereof to cause said partial rotation of said trunnion mountings.

3. A structure as specified in claim 1, said instrumentalities comprising an axially movable sleeve member on said head, and devices co-operating with said sleeve member to cause the axial movement thereon to cause said partial rotation of said trunnion mountings, in combination with adjusting screws interposed between said sleeve member and said devices, said screws being operative to relatively rotate said sleeve and thereby adjust said trunnion mountings about their axes.

4. A structure as specified in claim 1, said instrumentalities comprising a ring gear, said trunnion mountings having pinion teeth for engaging the teeth of said ring gear, including screw means for relatively rotating said ring gear to partially rotate said trunnion mountings about their axes.

5. A structure as specified in claim 1, in combination with means whereby each chaser is rotatably adjustable on its allotted eccentric trunnion mounting.

6. A structure as specified in claim 1, in combination with means whereby each chaser is rotatably adjustable on its allotted eccentric trunnion mounting, and means whereby each chaser is adjustably held with its axis at an angle to the axis of its allotted trunnion mounting, so that each chaser is skewed on the outer end of its trunnion mounting.

7. A structure as specified in claim 1, each trunnion mounting having pinion teeth forming part of said instrumentalities, and the latter also including an internally toothed ring gear for engaging said pinion teeth, together with means for causing relative rotation of said ring gear to cause the chasers to grip or release the metal stock, upon the commencement and completion of the work, and including other means for causing such relative adjustment of said ring gear to accurately adjust the cutting position of the chasers with respect to the diameter of the stock.

8. A structure as specified in claim 1, said instrumentaltities comprising an outer reciprocating sleeve having internal ring gear teeth, the trunnion mountings having pinion teeth for engaging the ring gear teeth, a ring member, key screws adjustably connecting the sleeve with said ring member, there being a body member for said cutter head, and including means permitting relative rotation between said body member and said ring member when said sleeve and ring member are reciprocated axially.

9. In a cutter head, the combination of a body having a plurality of sockets each having a chaser, a mounting in the socket for each said chaser, said chasers forming rotatively adjustable caps on the outer ends of said mountings, an annular washer ring rotatably adjustable on each said mounting, adjustably and peripherally engaging the chaser, inside the chaser, each chaser extending over the periphery of its washer, and means to hold each mounting against axial displacement, but permitting movement of each chaser nearer or closer to the axis of said head, the periphery of each said ring being wider at one side thereof than at the other, thereby holding the chaser obliquely or in a skewed position on each said mounting.

10. In a cutter head, the combination of a body having a plurality of sockets each having a chaser, a mounting in the socket for each said chaser, said chasers forming rotatively adjustable caps on the outer ends of said mountings, an annular washer ring rotatably adjustable on each said mounting, adjustably and peripherally engaging the chaser, inside the chaser, each chaser extending over the periphery of its washer, and means to hold each mounting against axial displacement, but permitting movement of each chaser nearer or closer to the axis of said head, each said mounting having an eccentric portion upon which the chaser is carried, and means for partially rotating each said mounting to adjust the chaser toward and away from the work.

11. A structure as specified in claim 1, said instrumentalities comprising a movable sleeve member on said head, and devices cooperating with said sleeve member to cause the movement thereof to cause said partial rotation of said trunnion mountings.

12. A structure as specified in claim 1, said instrumentalities comprising a movable sleeve member on said head, and devices cooperating with said sleeve member to cause the movement thereof to cause said partial rotation of said trunnion mountings, in combination with adjusting means interposed between said sleeve member and said devices, said means being operative to relatively rotate said sleeve and thereby adjust said trunnion mountings about their axes.

13. A structure as specified in claim 1, said instrumentalities comprising a ring gear, said trunnion mountings having pinion teeth for engaging the teeth of said ring gear, including means for relatively rotating said ring gear to partially rotate said trunnion mountings about their axes.

14. A cutter head provided with a body having parallel cylindrical recesses, rotatable members in said recesses, said members being formed with eccentric outer end portions, chasers on said eccentric end portions, rotatably mounted thereon, screws extending axially through said chasers and into said eccentric end portions, forming the axes of the chasers for adjustment rotatably on said members, permitting outward removal of the chasers by removal of said screws, means to hold the chasers in adjusted positions on said members, means to partially rotate said members to adjust the chasers for stock of different diameters, and means to automatically partially rotate said members to automatically open and close the cutter head.

15. A structure as specified in claim 14, said members having gear teeth on their inner end portions, and said means for partially rotating said members comprising a gear ring with internal gear teeth to engage said first-mentioned gear teeth.

16. A structure as specified in claim 14, said means for causing the opening and closing of the cutter head comprising a sleeve having axial adjustment on said body.

17. A structure as specified in claim 14, comprising means for positioning said chasers with their individual axes extending non-parallel with the axes of said screws.

Specification signed this twenty-second day of January, 1929.

CYRUS M. BOSWORTH.